B. A. RAYNOR.
RESILIENT AND DEMOUNTABLE WHEEL RIM.
APPLICATION FILED NOV. 21, 1919.

1,374,113.

Patented Apr. 5, 1921.

Witnesses
R. G. Thomas

Inventor
B. A. Raynor
By Victor J. Evans
Attorney

UNITED STATES PATENT OFFICE.

BENJAMIN A. RAYNOR, OF MUSKOGEE, OKLAHOMA.

RESILIENT AND DEMOUNTABLE WHEEL-RIM.

1,374,113.  Specification of Letters Patent.  Patented Apr. 5, 1921.

Application filed November 21, 1919. Serial No. 339,535.

*To all whom it may concern:*

Be it known that I, BENJAMIN A. RAYNOR, a citizen of the United States, residing at Muskogee, in the county of Muskogee and State of Oklahoma, have invented new and useful Improvements in Resilient and Demountable Wheel-Rims, of which the following is a specification.

The object of my present sole invention is the provision of a simple, efficient and durable resilient rim for use on the wheels of automobiles and other vehicles, with a view to taking up shock and jar.

To the attainment of the foregoing, the invention consists in the improvement as hereinafter described and definitely claimed.

In the accompanying drawings, hereby made a part hereof:

Similar numerals of reference designate corresponding parts in all of the views of the drawings.

Figure 1:
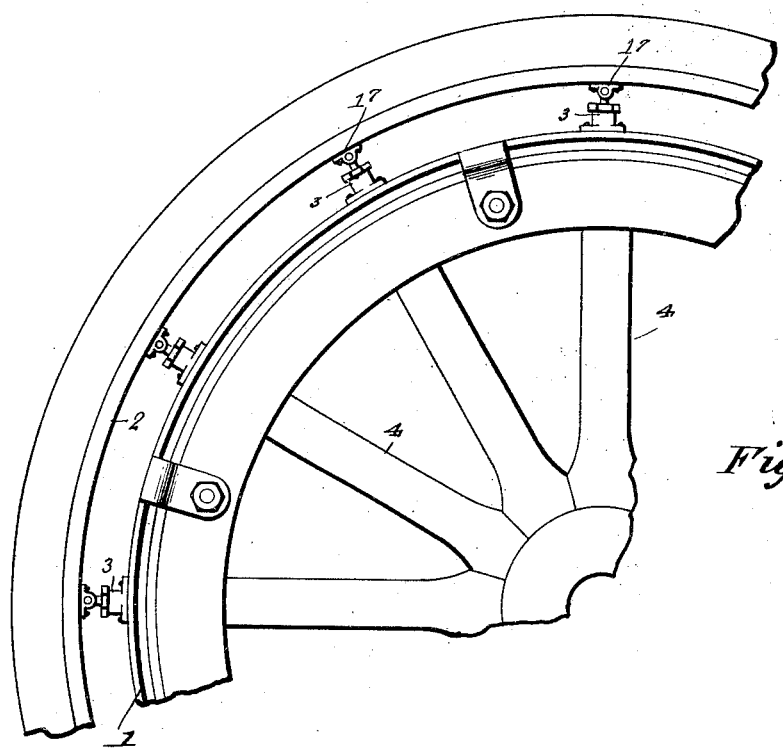
Figure 1 is a side elevation of so much of a wheel as is necessary to illustrate the mode of using my novel rim.

My novel rim is adapted to be used on any wheel capable of carrying a demountable rim, without entailing change in the structure of the wheel, and the said rim is made up of an inner metallic annulus 1, an outer metallic annulus 2, separated by an intervening space from the annulus 1, and a plurality of cushioning units 3 interposed between and connected to the annulli 1 and 2, and corresponding in number by preference with the spokes 4 of the wheel, and arranged, by preference, in alinement with the said spokes.

Figure 2:
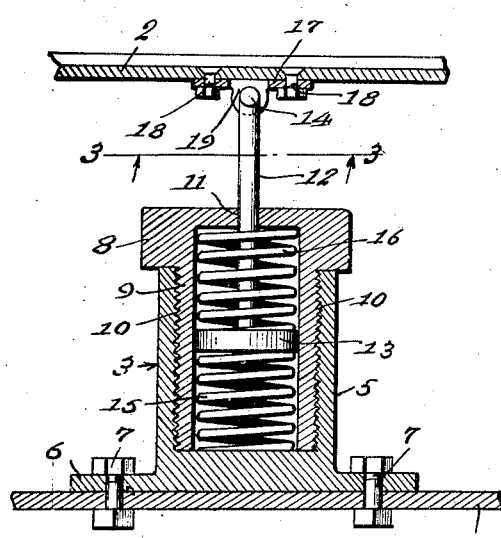
Fig. 2 is an enlarged, detail diametrical section showing one of the cushion units of my novel rim and the parts connected therewith.

The cushioning units 3 are identical in construction, and therefore a detailed description of the one shown in Fig. 2 will suffice to impart a definite understanding of all. The unit referred to is made up of a socket member 5, flanged at 6 and connected at 7 to the inner annulus 1, a cap member 8 having a reduced and tubular portion 9, threaded at 10 into the socket member 5, and having a central aperture 11, a plunger 12 movable radially through said aperture 11 and having an enlargement 13 within the tubular portion 9 of the cap member, and also having a T-head 14 at its outer end disposed transversely of the rim, springs 15 and 16 housed in the casing formed by the members 5 and 8 and arranged against and at opposite sides of the enlargement 13, and a bearing member 17, connected at 18 to the inner side of the outer annulus 2 and receiving the head 14 of the plunger 12, the head 14 being adapted to rock about its axis in the bearing.

Figure 3:
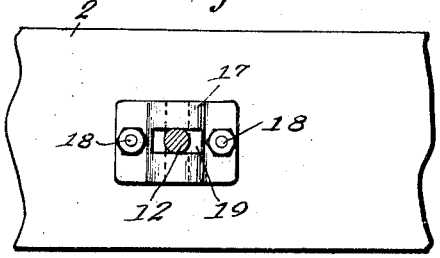
Fig. 3 is a section on the line 3—3 of Fig. 2, looking radially.

As shown in Fig. 3, the bearing 17 is slotted, as indicated by 19, to permit of sidewise play of the plunger rod 12.

The outer annulus 2 of the rim may be and preferably is equipped with a tread 20, of rubber or other appropriate material, so that the wheel equipped with my improvement will, as a whole, be of about the same diameter as a wheel carrying the ordinary pneumatic tire.

It will be apparent from the foregoing that my novel rim is applied to efficiently cushion a wheel, and is also well adapted to withstand the rough usage to which wheel rims are ordinarily subjected. It will be noticed particularly in this connection that there is little liability of dust and dirt interfering with the action of the springs 15 and 16, or the free turning of the heads 14 in the bearings 17.

It will be manifest from Fig. 1 of the drawings that the inner annulus and the outer annulus of my improvement are resilient, and that the inner annulus is spaced from the felly to which it is attached at intervals.

Having described my invention, what I claim and desire to secure by Letters-Patent, is:

A wheel rim comprising an inner metallic annulus, an outer metallic annulus surrounding and spaced from the inner annulus, and radially-disposed cushioning units interposed between the inner and outer annuli and separated by intervening spaces; each of the said units being made up of a radial socket member having base flanges connected to the inner annulus and also having an interior thread, a cap member having a central radial aperture and also having a reduced and threaded tubular portion arranged in and connected by the threads to the socket member, a bearing member connected to the inner side of the outer annulus and having a transverse aperture of circular form in cross section and also having a longitudinal slot at right angles to said aperture, a plunger rod extending loosely through the central aperture in the cap and having an enlargement at its inner end housed in the tubular portion of the cap and also having a T-head of circular form in cross section journaled in the aperture of the bearing member, a spring interposed between the enlargement of the plunger and the base of the socket member, and a spring surrounding the plunger rod and interposed between said enlargement and the outer end of the cap member; said springs housed in the tubular portion of the cap member.

In testimony whereof I affix my signature.

BENJAMIN A. RAYNOR.